(12) United States Patent
Garland (10) Patent No.: US 8,314,393 B2
(45) Date of Patent: *Nov. 20, 2012

(54) METHOD AND APPARATUS FOR DETECTING UNSAFE CONDITIONS

(75) Inventor: Russell S. Garland, Lexington, KY (US)

(73) Assignee: Qualex Manufacturing, LC, Georgetown, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/330,727

(22) Filed: Dec. 20, 2011

(65) Prior Publication Data

US 2012/0095720 A1 Apr. 19, 2012

Related U.S. Application Data

(63) Continuation of application No. 12/306,378, filed on Dec. 23, 2008, now Pat. No. 8,101,917.

(51) Int. Cl.
 *G01J 5/02* (2006.01)
(52) U.S. Cl. .......... 250/342; 250/341.8; 250/338.1; 340/679; 340/680; 72/3; 72/4; 72/16.1
(58) Field of Classification Search .......... 192/130, 192/129 R, 133; 382/103; 340/507, 552, 340/680, 383.1, 556, 555, 557; 361/170, 361/174, 191; 72/16.1, 20.1, 20.2, 21.1, 72/21.3, 16.5; 100/348, 341; 307/116, 125, 307/221; 250/221, 338.1, 339.01, 339.02
See application file for complete search history.

(56) References Cited

U.S. PATENT DOCUMENTS

| 4,015,122 A | 3/1977 | Rubinstein |
| 4,166,369 A | 9/1979 | Nakajima |
| 4,249,074 A | 2/1981 | Zettler et al. |
| 4,280,164 A | 7/1981 | Kozek |
| 4,520,262 A | 5/1985 | Denton |
| 4,818,866 A | 4/1989 | Weber |
| 4,902,893 A | 2/1990 | Burrer |
| 4,907,432 A | 3/1990 | Maillefer |
| 5,168,173 A | 12/1992 | Windsor |
| 5,198,661 A | 3/1993 | Anderson et al. |
| 5,243,183 A | 9/1993 | Barron et al. |
| 5,280,622 A | 1/1994 | Tino |
| 5,345,138 A | 9/1994 | Mukaidono et al. |
| 5,461,231 A | 10/1995 | Sugimoto et al. |
| 5,579,884 A | 12/1996 | Appleyard et al. |

(Continued)

FOREIGN PATENT DOCUMENTS

EP 0 793 208 9/1997

(Continued)

OTHER PUBLICATIONS

International Search Report for Application No. PCT/US2007/014798 dated Mar. 14, 2008.

(Continued)

*Primary Examiner* — David Porta
*Assistant Examiner* — Yara Green
(74) *Attorney, Agent, or Firm* — Frost Brown Todd LLC (57) ABSTRACT

A device can be made operable to distinguish between materials impinging on a predefined area based at least in part on differentials within sets of data indicative of measurable characteristics of the materials impinging on the defined area. Such a device can trigger a protection mechanism based at least in part on identification of such differentials.

13 Claims, 8 Drawing Sheets

U.S. PATENT DOCUMENTS

| | | |
|---|---|---|
| 5,921,367 A | 7/1999 | Kashioka et al. |
| 6,047,634 A | 4/2000 | Futsuhara et al. |
| 6,105,491 A | 8/2000 | Dunaj |
| 6,316,763 B1 | 11/2001 | Appleyard |
| 6,334,077 B1 | 12/2001 | Futsuhara et al. |
| 6,389,860 B1 | 5/2002 | Stalzer |
| 6,461,231 B1 * | 10/2002 | Taylor et al. .................. 451/92 |
| 6,624,751 B2 | 9/2003 | Haberer et al. |
| 6,660,993 B2 | 12/2003 | Appleyard et al. |
| 6,786,145 B2 | 9/2004 | Killian et al. |
| 6,903,327 B1 | 6/2005 | Appleyard et al. |
| 6,919,555 B2 | 7/2005 | Fiessler |
| 7,439,512 B2 | 10/2008 | Garland |
| 8,101,917 B2 * | 1/2012 | Garland ........................ 250/342 |
| 2003/0024421 A1 | 2/2003 | Braune et al. |
| 2003/0079619 A1 | 5/2003 | Comley et al. |
| 2006/0197020 A1 | 9/2006 | Trzecieski et al. |

FOREIGN PATENT DOCUMENTS

| | | |
|---|---|---|
| EP | 1 107 204 | 6/2001 |
| EP | 1 589 279 | 10/2005 |
| JP | 10-083201 A | 3/1998 |
| JP | H10-083201 | 3/1998 |
| JP | 2000-043809 A | 2/2000 |
| JP | 2003-151472 | 5/2003 |
| JP | 2003-151472 A | 5/2003 |
| JP | 2006-133862 A | 5/2006 |
| WO | WO 03/015951 | 2/2003 |
| WO | WO 03/104711 | 12/2003 |
| WO | WO 2005/068896 | 7/2005 |

OTHER PUBLICATIONS

English Abstract of European Application No. EP 1 589 279 dated Oct. 26, 2005.
Japanese Office Action for Application No. JP 2009-518218 dated Feb. 10, 2012.
English Translation of Japanese Office Action for Application No. JP 2009-518218 dated Feb. 10, 2012.
English Abstract of Japanese Application No. JP 10-083201 dated Mar. 31, 1998.
English Abstract of Japanese Application No. JP 2000-043809 dated Feb. 15, 2000.
English Abstract of Japanese Application No. JP 2003-151472 dated May 23, 2003.
English Abstract of Japanese Application No. JP 2006-133862 dated May 25, 2006.
English Abstract of Japanese Patent 2003-151472, May 23, 2003.
English Abstract of Japanese Patent H10-83201, Mar. 31, 1998.
Summary of Notice of Preliminary Rejection dated Jul. 11, 2012 for Korean Patent Application No. 7001387/2009 from PCT/US2007/014798.

* cited by examiner

METHOD AND APPARATUS FOR DETECTING UNSAFE CONDITIONS

CROSS REFERENCE TO RELATED APPLICATIONS

The present application is a continuation of, and claims the benefit of, U.S. patent application Ser. No. 12/306,378, "METHOD AND APPARATUS FOR DETECTING UNSAFE CONDITIONS", filed on Dec. 23, 2008, which itself claimed the benefit of PCT application PCT/US2007/014798, filed Jun. 26, 2007 and having the same title, which itself claimed priority from U.S. patent application Ser. No. 11/474,642, filed Jun. 26, 2006 and having the same title, which issued on Oct. 21, 2008 as U.S. Pat. No. 7,439,512.

FIELD OF THE INVENTION

This invention is in the field of safety devices. Particularly, this invention is in the field of safety devices which can be triggered based at least in part on differentials between data measurements.

BACKGROUND OF THE INVENTION

Often, a safety device is designed in such a way that it can be triggered by the entry of a human extremity or other objects into a predefined area. Unfortunately, those safety devices can be prone to generating false danger signals, that is, they might indicate an unsafe condition exists when, in fact, no such condition is present. In many cases, false alarm signals might be generated due to an inability of the safety device to distinguish between different objects within the area that the safety device monitors. The present invention is designed to distinguish between materials based on measurable characteristics of the monitored areas.

DETAILED DESCRIPTION

For purposes of clarity, definitions for certain terms used in this application are set forth below. It should be understood that such definitions are set forth for purposes of clarifying the application only, and that the setting forth of such definitions is not intended to imply that the functions, components, and/or concepts defined below are necessary for the invention, or that they are present in any particular embodiment.

The term adjust (and the various forms thereof) should be understood to mean to change some aspect of. For example, in the context of a field of view, adjusting the field of view could refer to adjusting the field of view's position (e.g., moving it within a field of measurement), adjusting its size (e.g., increasing the area monitored by the field of view), adjusting its shape (e.g., adjusting a field of view so that it is elliptical rather than circular), or making any other type of change to the field of view.

The term differential should be understood to refer to a value based at least in part on the difference between two or more values.

The term direction of motion in the context of a machine should be understood to refer to the movement of a working part of the machine. A non-limiting example of such a direction of motion would be the downward movement of a ram in a press brake.

The term field of measurement should be understood to refer to the area in which a measurement device collects data.

The term field of view should be understood to refer to a specific area within the field of measurement from which a particular measurement is taken.

The term indicate should be understood to refer to an act of identifying or specifying the thing being indicated.

The term linear should be understood to mean long and narrow.

The term light source should be understood to refer to any device capable of emitting electromagnetic radiation.

The term oscillate should be understood to refer to back and forth movement, which movement might be either continuous, or might proceed in discrete steps.

The term processing unit should be understood to mean any device or collection of devices which can perform an action or a series of actions with respect to one or more pieces of input information. Non-limiting illustrations of processing units include individual logic gates, and devices which could be built from combinations of logic gates, devices which are functionally controlled by software or firmware, and special purpose computers embodying algorithms in hardware, which may or may not have the capacity to store additional data and/or instructions.

The term progression of steps should be understood to refer to a series of steps in which the steps are performed in a given order. It should be understood that specification of a progression of steps does not exclude a series in which additional steps are included in the progression. Thus, a progression of steps (r), (b) and (j) refers to any series in which step (b) follows step (r) and precedes step (j), even if there are intervening steps between steps (b) and (j) and/or between steps (r) and (b).

The term spatial differential should be understood to mean a differential established by comparing two or more simultaneous, or nearly simultaneous, measurements.

The term temporal differential should be understood to mean a differential established by comparing two or more measurements obtained at different times.

The term trigger, when used as a verb, should be understood to refer to the act of setting off, activating, or sending a signal causing some action.

The term unsafe condition should be understood to refer to any condition or situation which presents an increased likelihood of an undesirable event taking place.

All embodiments set forth herein are intended to illustrative and, therefore, non-limiting. While the discussion below is set forth in the context of safety devices for industrial machines, it should be understood that that discussion is not intended to be limiting on contexts in which the invention might be utilized, and is instead set forth to allow individuals skilled in the art to practice certain preferred embodiments of the invention.

Figure 1:
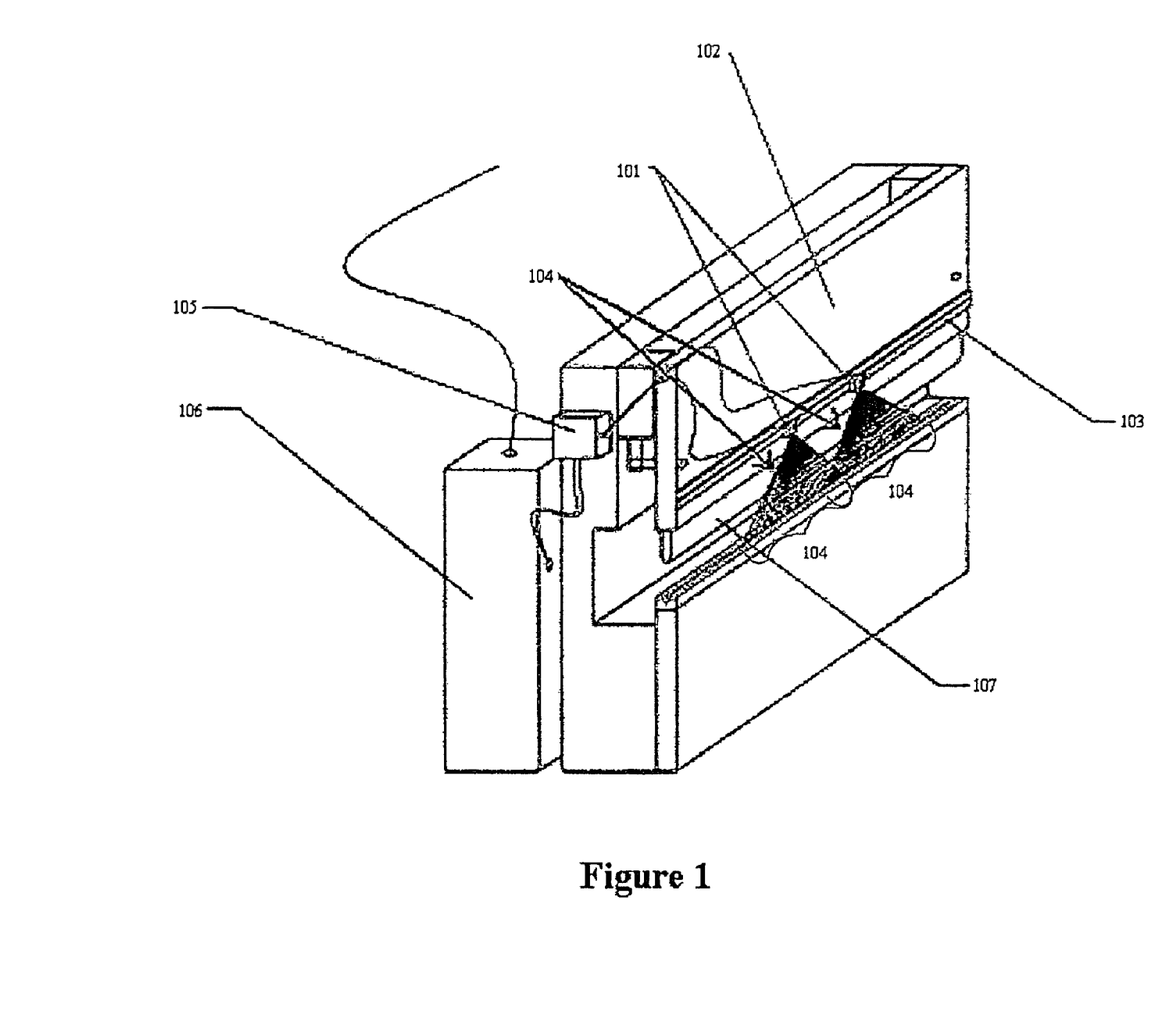
FIG. 1 depicts an exemplary embodiment of the invention comprising dual measurement devices positioned on a machine.

In FIG. 1, an embodiment is shown in which multiple measurement devices [101] are positioned on an industrial machine (e.g., a press brake) [102] by means of a mounting rail [103]. The measurement devices [101] are configured to collect data about the areas of the machine [102] which are within their respective fields of measurement [104], and to communicate that data to a processing unit [105] which is operable to trigger a protection mechanism [106]. In an embodiment of the type depicted in FIG. 1, the processing unit [105] would trigger the protection mechanism [106] if the data communicated by the measurement devices [101] indicates that a human finger, or some other part of a human body, has entered an area where it has the potential to be injured by the press tool [107] of the machine [102], thereby causing an unsafe condition. Once triggered, the protection mechanism [106] would interrupt the operation of the machine [102] until the data communicated by the measurement devices [101] indicates that the unsafe condition has been remedied.

Figure 2A:
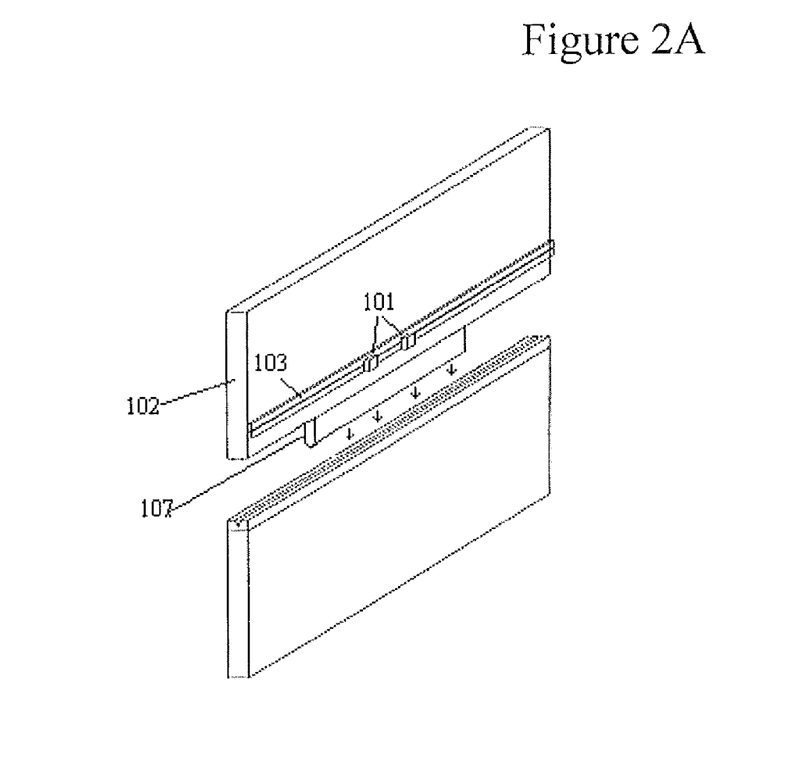
FIGS. 2a-2d depict a sequence of events which might take place in an embodiment of the type shown in FIG. 1.
Figure 2B:
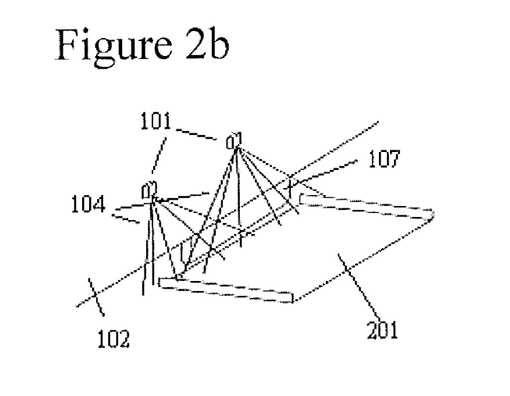
Figure 2C:
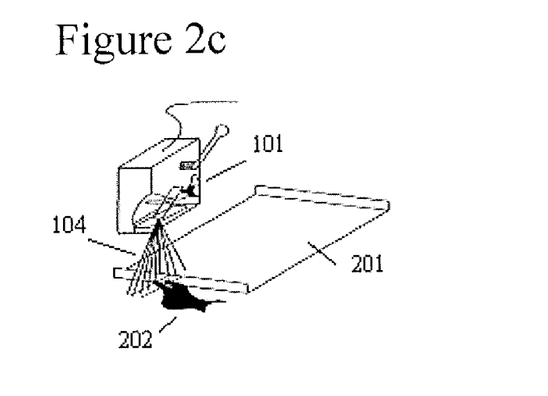
Figure 2D:
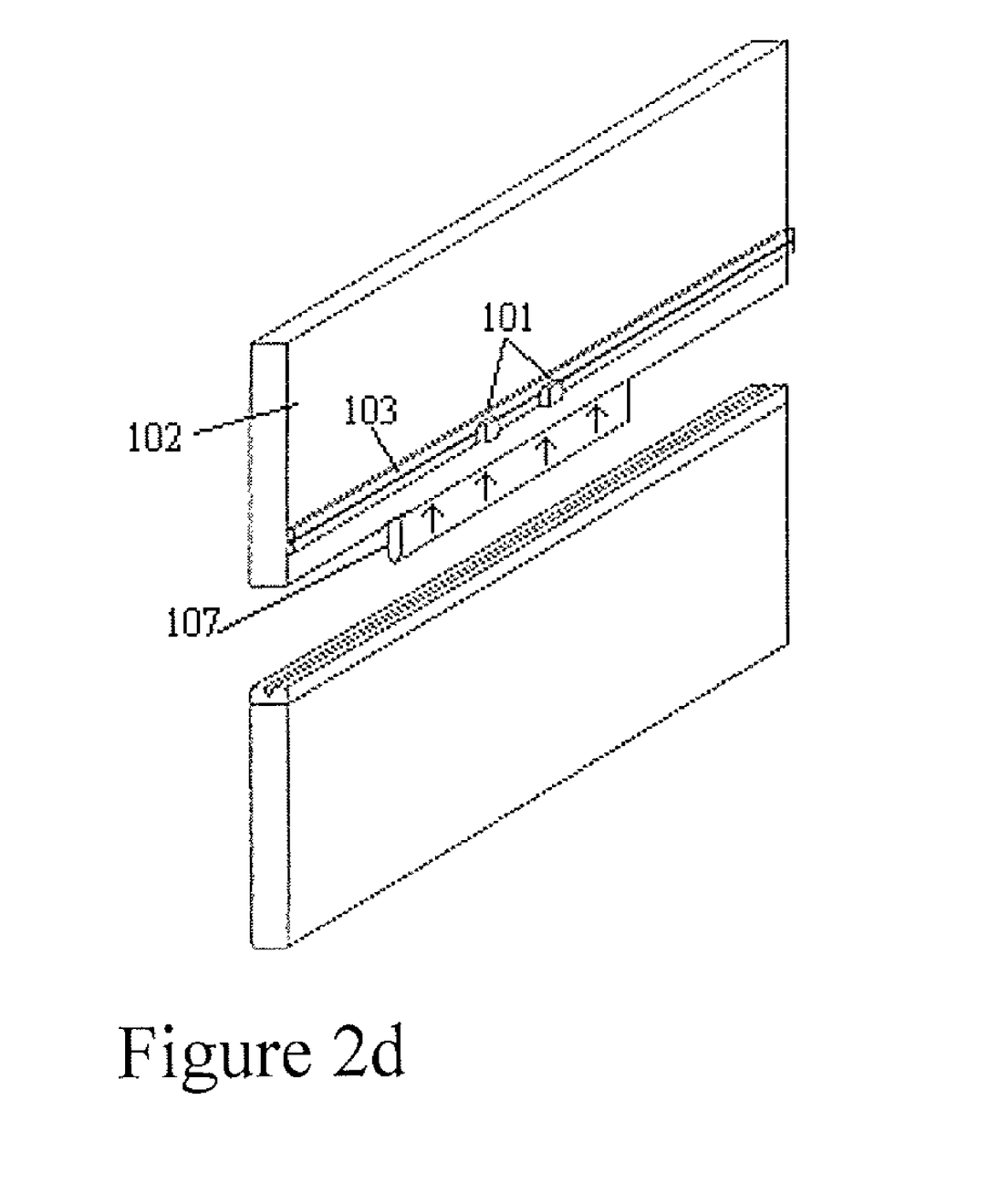

Turning to FIGS. 2a-2d, those diagrams depict a sequence of events which might take place during the operation of an embodiment of the type shown in FIG. 1. FIG. 2a depicts the normal operation of a machine [102] in which the press tool [107] of the machine [102] is descending. FIG. 2b depicts the placement of material [201] to be worked by the machine [102] beneath the press tool [107]. As can be seen in FIG. 2b, while the press tool [107] is descending towards the material [201] to be worked, each measurement device [101] is constantly collecting data about the area within its respective field of measurement [104]. Optimally, of course, the press tool [107] will continue to descend and the material [201] placed beneath it will be worked without incident. However, for the sake of illustrating the operation of an embodiment used as a safety feature for a machine [102], assume that, as depicted in FIG. 2c, an unsafe condition is created by the operator inadvertently placing a part of his or her body [202] within the field of measurement [104] of the measurement device [101] where the body part [202] might be crushed or otherwise injured by the continued descent of the press tool [107] (not shown in FIG. 2c). In such a situation, where an unsafe condition has been created, the processing unit [105] (not shown in FIGS. 2a-2d) would trigger the protection mechanism [106] (not shown in FIGS. 2a-2d), halting the descent of the press tool [107], and causing it to retract before coming into contact with the operator's body [202], as shown in the diagram of FIG. 2d.

Of note in the sequence depicted in FIGS. 2a-2d is that the protection mechanism [106] is triggered selectively, that is, it is triggered as a result of the entry of a portion of the operator's body [202] into the field of measurement [104] of the measurement device [101] as shown in FIG. 2c, but it is not triggered as a result of the entry of the material [201] to be worked into the field of measurement [104] of the measurement device [101], as shown in FIG. 2b. One method of selectively triggering a protection mechanism [106] in an embodiment of the type depicted in FIG. 1 is shown in the flow chart of FIG. 3. Initially, before beginning to use a machine [102], the operator establishes an initial ambient temperature [301]. For example, the operator might press a button on a measurement device [101] which causes the measurement device [101] to collect data regarding temperature of the material within its field of view (which would be the surface of the machine [102] below the press tool [107] if no material [201] had been inserted into the machine [102]) and send that data to the processing unit [105]. The processing unit [105] then determines whether the ambient temperature indicates the existence of an unsafe condition [302] (e.g., an increased likelihood that the invention would not be able to detect a differential due to the temperature of the machine and its environment being close to the temperature of a human body). That determination is made by establishing whether the ambient temperature is within a certain range of human body temperature (e.g., an ambient temperature between 95.8 and 101.8 degrees Fahrenheit, though other ranges could be used depending on characteristics of the measurement device [101], such as its ability to accurately distinguish between materials within a given temperature range). If the ambient temperature is within that range, such as because the operator had inadvertently placed a part of his or her body [202] in the field of view of the measurement device [101] while the initial ambient temperature is being established [901], or such as because the temperature of the machine [102] and its surrounding environment is similar to the temperature of a human body, or for some other reason, the processing unit [105] would notify the operator of the existence of an unsafe condition [303], and the process would have to be restarted with the operator establishing a new initial ambient temperature [301] which, hopefully, does not indicate the existence of an unsafe condition.

Figure 3:
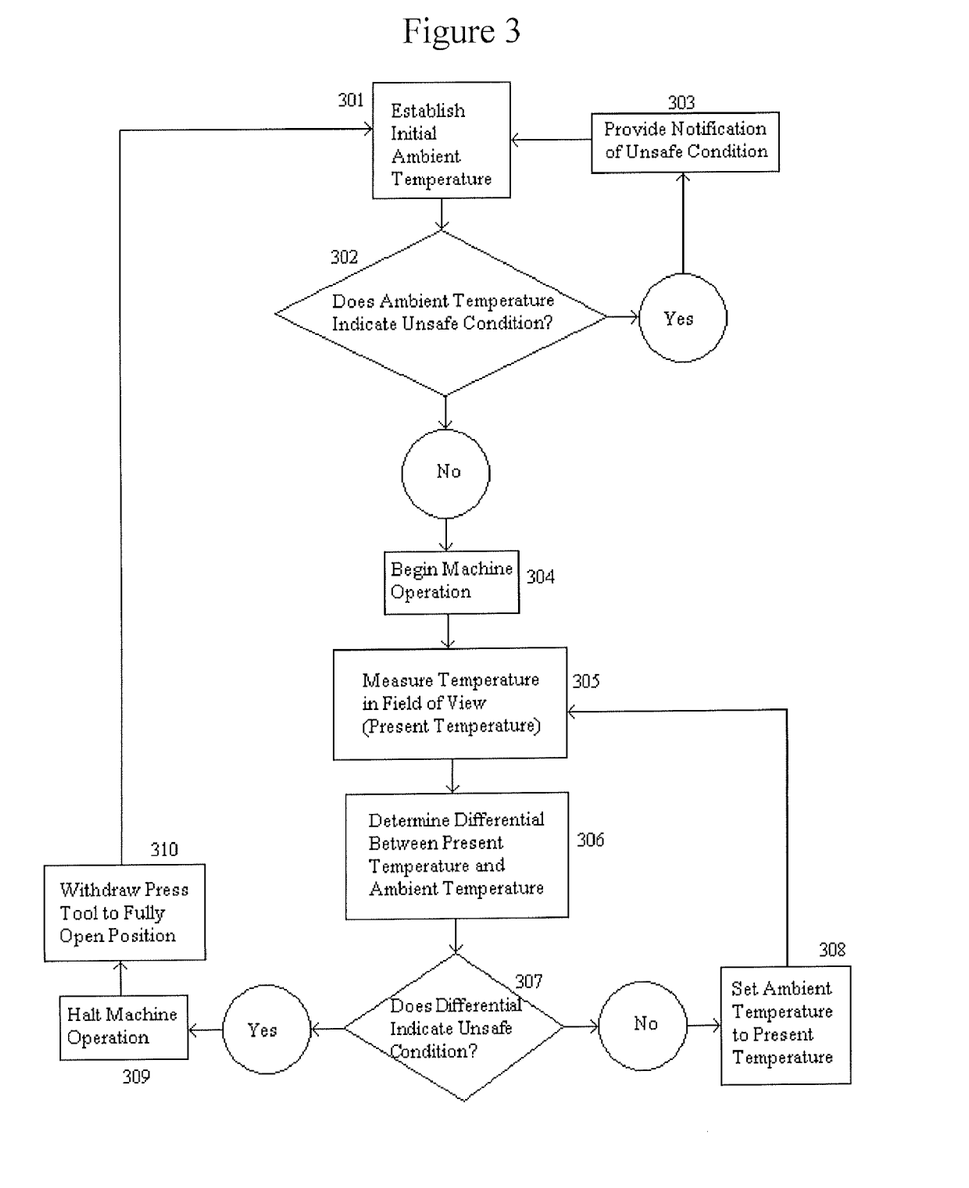
FIG. 3 depicts a series of actions which might be used to ensure the safety of an operator of an embodiment of the type shown in FIG. 1.

After establishing an initial ambient temperature that does not indicate an unsafe condition, the machine [102] begins operation [304]. While the machine [102] is operating (e.g., while the press tool 107 is descending to work material being inserted into the machine), the measurement device [101] collects data [305] indicating the temperature of the material within its field of view, and communicates that data to the processing unit [105]. The processing unit [105] then determines a differential [306] between the data sent from the measurement device [101] (the present temperature) and the data indicating the ambient temperature it had stored earlier. As an illustration of how the differential might be determined, the processing unit [105] might subtract the ambient temperature from the present temperature, and then treat the absolute value of the result of that subtraction as the differential. Alternatively, in some embodiments, rather than subtracting the ambient temperature from the present temperature and determining the absolute value, some embodiments might simply subtract the ambient temperature from the present temperature and use the resulting value as the differential. Such an alternative method of calculation would be useful in embodiments in which any human extremities impinging upon the field of measurement [104] of the temperature measurement device [101] would always be warmer than the material to be worked. Once the differential has been determined [306], the processing unit [105] would determine whether the differential indicates the existence of an unsafe condition [307], which might be done by examining whether the differential exceeds some predefined threshold (e.g., 3 degrees Fahrenheit).

In FIG. 3, after the processing unit [105] has made the determination of whether the differential indicates an unsafe condition [307], two potential sequences of events might take place. If the differential does not indicate an unsafe condition, then the processing unit [105] sets its stored ambient temperature equal to the present temperature [308]. For example, if the processing unit [105] had stored data indicating that the ambient temperature was 62 degrees, and received data indicating that the present temperature is 63 degrees, after determining that the differential between 62 and 63 degrees does not indicate an unsafe condition, the processing unit [105] would replace the information indicating that the ambient temperature is 62 degrees with information indicating that the ambient temperature is 63 degrees. After the processing unit [105] updates the ambient temperature [308], the process would repeat, with the measurement device [101] measuring a new present temperature [305], and using that present temperature as the basis for a comparison similar to that already described. Alternatively, if the differential does indicate the existence of a dangerous condition, the processing unit [105] triggers the protection mechanism [106], which halts [309] the operation of the machine [102] and causes the press tool [107] to withdraw into an open position [310]. From that point, the sequence might start over completely, with an initial ambient temperature being established [301], a determination being made if that initial ambient temperature indicates an unsafe condition [302], and the machine only resuming operation [304] once the new initial ambient temperature does not indicate an unsafe condition.

While the above discussion of FIG. 3 describes how the particular actions of FIG. 3 might be performed, the invention is not intended to be limited to embodiments in which the actions of FIG. 3 are performed in the manner described above. For example, in the above description, the act of establishing an initial ambient temperature [301] is performed by pressing a button on a measurement device [101] which causes the measurement device [101] to collect data about the temperature of material in its field of view, and using that data as the initial ambient temperature. As an alternative, the act of establishing an initial ambient temperature [301] might be performed by the field of view of the measurement device [101] oscillating through its field of measurement [104], collecting temperature data regarding each field of view within the field of measurement [104]. That temperature data might be sent to the processing unit [105]. The processing unit [105] might perform some statistical calculations on that data (e.g., obtain the mean, median, and mode values for the data) and then use the results of the statistical calculations as the initial ambient temperature. As an additional example of a method of performing one of the steps from FIG. 3 which is different from that set forth in the discussion of FIG. 3, consider the process of determining a differential between a present temperature and ambient temperature data [306] by determining the difference between the present temperature and the ambient temperature in terms of a percentage, rather than in terms of an absolute difference in temperature. Additionally, another alteration which might be made to the steps of FIG. 3 is to configure the protection mechanism [106] so that, when triggered, it simply halts operation of the machine [102], instead of halting operation of the machine and withdrawing the press tool, as set forth in FIG. 3.

As will be clear to one of ordinary skill in the art, in addition to variations on the performance of the steps of FIG. 3 of the type set forth above, it is also possible to practice the invention in a manner which diverges from the steps of FIG. 3 themselves. In some alternate embodiments, a measurement device [101] might not collect temperature data, therefore, for an embodiment in which a measurement device [101] does not collect temperature data, the steps of FIG. 3 would be altered to accommodate the type of data which that device did collect (e.g., emissivity data). Further, as an alternative to having a predefined differential the differential might be configurable such that the user could select any differential which would indicate that a first value is based on a measurement of the material to be worked (e.g., steel) while the second value is based on a measurement of a part of an operator's body (e.g., a finger). One method for a user to configure a measurement device [101] is to have the measurement device [101] actually take measurements, first of a material to be worked, then of a part of a human body which might accidentally impinge on the measurement device's [101] field of measurement [104], thus relieving the user of the invention of the task of deciding on a suitable differential, as such a differential could then be determined automatically. As a further modification after determining whether the differential indicates an unsafe condition [307], the processing unit [105] would determine whether the present temperature itself indicates an unsafe condition, for example, by determining whether the present temperature is within a certain range of the temperature of a human body. As yet a further modification, the use of differentials might be omitted all together. As an example of how unsafe conditions might be detected without the use of differentials, during operation of a machine, the processing unit [105] might compare present temperature measurements with a predetermined temperature range (such as a range based at least in part on human body temperature, as described above) and trigger the protection mechanism [106] based on that comparison. In such a modified sequence, storing and updating ambient temperature measurements would be unnecessary. Of course, as will be obvious to one of ordinary skill in the art in light of this disclosure, measurements other than temperature measurements (e.g., emissivity measurements) could be used without departing from the scope or spirit of the invention.

In general, embodiments of the type depicted in FIG. 1 must operate so that the time between the inception of an unsafe condition (e.g., an operator placing a portion of his or her body [202] under the descending press tool [107] of a machine [102]) and the operation of the protection mechanism [106] (e.g., halting [309] the descent of the press tool [107]) is less than the time necessary for the event represented by the unsafe condition (e.g., the press tool [107] contacting and crushing a portion of the operator's body [202]) to take place. As will be apparent to one of ordinary skill in the art, by far the most time consuming of the steps which take place between two successive determinations of whether an unsafe condition exists is obtaining a present temperature measurement [305], because the other steps can be performed so quickly as to be virtually instantaneous (e.g., transmitting data from a measurement device [101] to a processing unit [105] can be achieved nearly instantaneously by transmitting signals over wires; the functions of the processing unit [105] can be performed nearly instantaneously through the use of high speed computer chips or logic gates; etc.). Thus, some embodiments might include features particularly designed to minimize the time required for data collection. One such feature might be restricting the use of an embodiment to situations where the ambient temperature is substantially different from the temperature of a human body (e.g., a differential of 10 degrees or more), thus allowing differentials to be detected on the basis of less accurate data. This would decrease the time required for data collection because, as a general rule, more accurate data collection requires more time to be performed. Further, since a measurement device [101] is required to collect data indicating whether an unsafe condition exists anywhere in its field of measurement [104], not only the time required to collect data regarding a single field of view, but also the time required to examine each field of view within a field of measurement [104] must be considered for purposes of ensuring operator safety. Thus, a second feature which might be utilized to decrease the time required for data collection is to increase the size of the field of view of a measurement device, thereby decreasing the number of field of view measurements necessary to collect data regarding an entire field of measurement [104].

Figure 4:
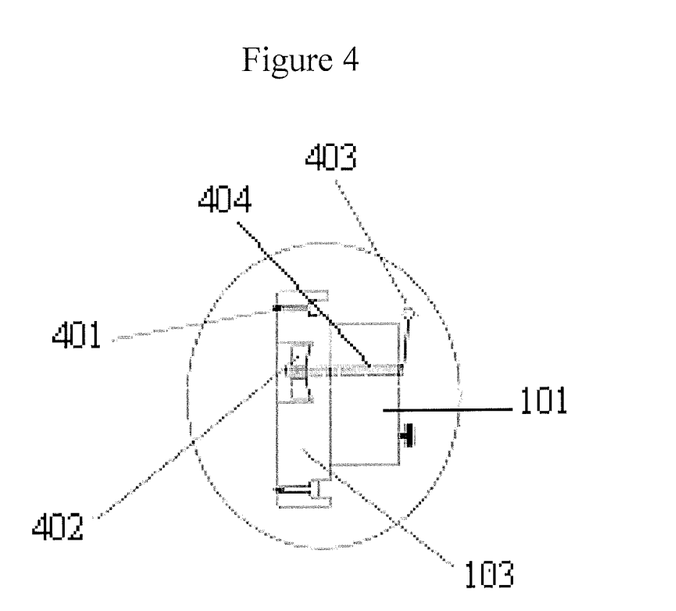
FIG. 4 depicts a side view of a measurement device and a mounting rail.

FIG. 4 shows an interface between a mounting rail [103] and a measurement device [101]. In an embodiment of the type shown in FIG. 4, the body of the mounting rail [103] is attached to the machine [102] (not shown) using fastening devices (e.g., bolts) [401]. The mounting rail [103] contains a groove [402], which allows the measurement devices [101] to slide along the length of the mounting rail [103]. Once the measurement device [101] has been placed in its desired position (e.g., by sliding), it can be fixed in that position through the use of a locking device [403]. In FIG. 4, the locking device [403] depicted is a screw [404] which, when turned, clamps the measurement device [101] against the mounting rail [103], preventing further movement of the measurement device [101]. While FIG. 4 depicts a certain configuration which could be used to position a measurement device [101] on a machine [102], it is intended to be illustrative only, and not limiting on the potential configurations for positioning a measurement device [101] on a machine [102]. For example, some embodiments might be equipped with alternative locking devices such as pins, pre-determined mounting locations in the mounting rail [103], magnets, or other types of devices. Additionally, the mounting rail [103] or other mounts which could act as an intermediary between a measurement device [101] and a machine [102], might be omitted all together, with the measurement devices [101] attached directly to machine itself [102] (e.g., using magnets, screws, bolts, welding, adhesive, or some other mechanism). Further, in some embodiments, a measurement device [101] might be included in a machine [102] by its manufacturer as an integral part of the machine [102], requiring no additional fastening device at all. These and other modifications could be implemented by one of ordinary skill in the art without departing from the scope or spirit of the invention.

Figure 5:
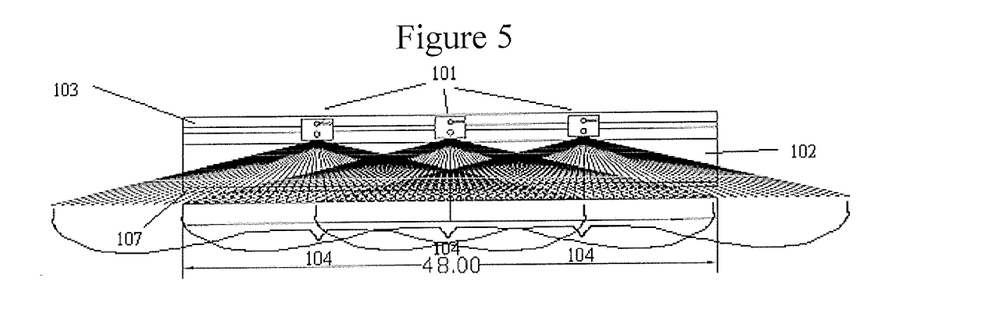
FIG. 5 depicts a configuration in which measurement devices are positioned such that they have overlapping fields of measurement.

For a depiction of how measurement devices [101] might collect data, consider FIG. 5, which shows an embodiment in which three measurement devices [101] are configured to collect data within three overlapping fields of measurement [104]. In the embodiment depicted in FIG. 5, each measurement device [101] has a field of measurement [104] with a length of 48 inches across the portion of the machine [102] towards which the press tool [107] descends. As will be apparent to one of ordinary skill in the art, the measurement devices [101] could be designed to monitor the area within their field of measurement [104] in a number of different ways. For example the measurement devices [101] might be designed such that their fields of view oscillate within the field of measurement [104]. Such oscillation might be continuous (e.g., a constant or smoothly varying rate of movement), or discontinuous (e.g., the field of view might remain stationary for a period of time necessary to take a measurement, then, once the data had been collected, moving to gather data from an adjacent field of view). In an embodiment in which the measurement devices [101] measure temperature, such oscillation might be achieved by connecting a commercially available temperature measurement device, such as the model M770 infraducer, manufactured by Mikron Infrared, Inc., to a small servo motor, a stepper motor, or some other type of electrical or mechanical device capable of producing vibrations or periodic motions. Alternatively, there might be included one or more mirrors or lenses which could themselves be moved while the infrared detector remained stationary, and the motion of the mirrors of lenses would cause the area monitored by the infrared detector (its field of view) to oscillate through the measurement device's [101] field of measurement [104]. In such an embodiment, the actual rate of oscillation could be any rate of oscillation great enough to prevent injury to the operator of the machine [102], given the rate of movement of the machine [102], and any delays in the function of the protection mechanism [106]. For example, for a hydraulic press with the following specifications:

| | | |
|---|---|---|
| Capacity | 242 | U.S. tons |
| Bed Length | 168 | inches |
| Maximum Stroke Length | 7.8 | inches |
| Open Height | 18.5 | inches |
| Throat Depth | 16.5 | inches |
| Distance Between Side Frames | 148 | inches |
| Ram Repeatability | +/- 0.0004 | inches |
| Approach Speed | 7.87 | inches per second |
| Bending Speed | 0.04 to 0.787 | inches per second, programmable |
| Return Speed | 0.04 to 7.87 | inches per second, programmable |
| Overall Machine Length | 193.7 | inches |
| Machine Width | 68.5 | inches (105" including control and pendant) |
| Machine Weight | 37,700 | pounds |
| Machine Power | 35.5 | KW |
| Foundation | 6 | inch concrete slab | a measurement device [101] might be configured to oscillate at a rate of approximately 78 inches/second, so that a 48 inch field of measurement [104] could be scanned in slightly over half a second.

The invention is not limited to embodiments which utilize adjustment of the rate of oscillation of a measurement device [101] to ensure operator safety. For example, in some embodiments, the number of times data is collected from a particular field of view within a field of measurement [104] might be increased, not by increasing the rate of oscillation of a measurement device [101], but by increasing the number of measurement devices [101], and positioning them such that their fields of measurement overlap. Such a configuration is shown in FIG. 5, in which three measurement devices [101] are positioned such that the fields of view of two of the measurement devices [101] will always be monitoring some point within the field of measurement [104] of the central measurement device [101]. Of course, as will be clear to one of ordinary skill in the art, in some embodiments, both the number of measurement devices [101], and the rate of oscillation might be customized to ensure operator safety. For example, in some situations, the rate of oscillation of a measurement device [101] might be determined by the rate of movement of the machine [102] and the delay associated with the protection mechanism [106], while the number of measurement devices [101] might be determined by the number of operators of the machine [102]. Further, other types of modifications which might be made to the rate of oscillation of the field of view of a measurement device [101], the number of measurement devices [101], and the field of measurement [104] from which the measurement devices [101] collect their data will immediately occur to one of ordinary skill in the art, and can be practiced without departing from the scope or spirit of the invention.

The invention is not limited to embodiments which include measurement devices [101] which have oscillating fields of view. For example, a measurement device [101] might be designed such that its field of view is coextensive with its field of measurement [104], thus obviating the need for oscillation. As an example of a method which could be used to monitor a field of view which is coextensive with a field of measurement [104], a measurement device [101] may comprise an infrared detector and a lens designed to define the area monitored by that detector. In an embodiment utilizing an M770 infraducer as described above, the lens would alter the field of view ratio of the infraducer. Normally, the infraducer has a field of view ratio of 60:1, that is, infraducer measures the temperature of a circular field of view, the diameter of which is $1;60^{th}$ of an inch for every inch of separation between the material being measured and the infraducer itself. However, in some embodiments, a lens could be used to change the field of view of the infraducer from a circle to an ellipse, the ellipse having a major diameter equal to the length of the measurement device's [101] field of measurement [104].

Figure 6A:
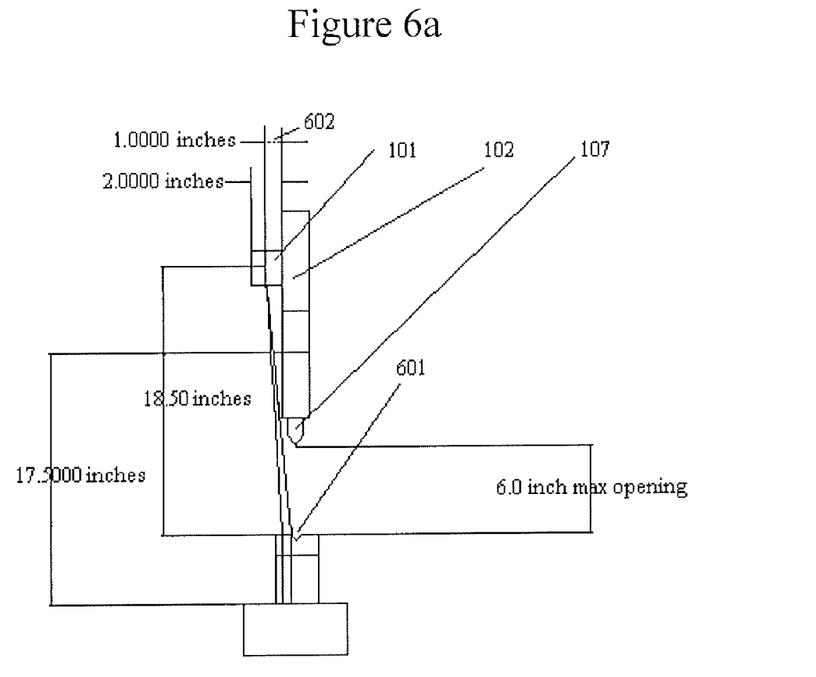
FIGS. 6a-6b depict a configuration in which a field of view axis is angled relative to the direction of motion of a machine.
Figure 6B:
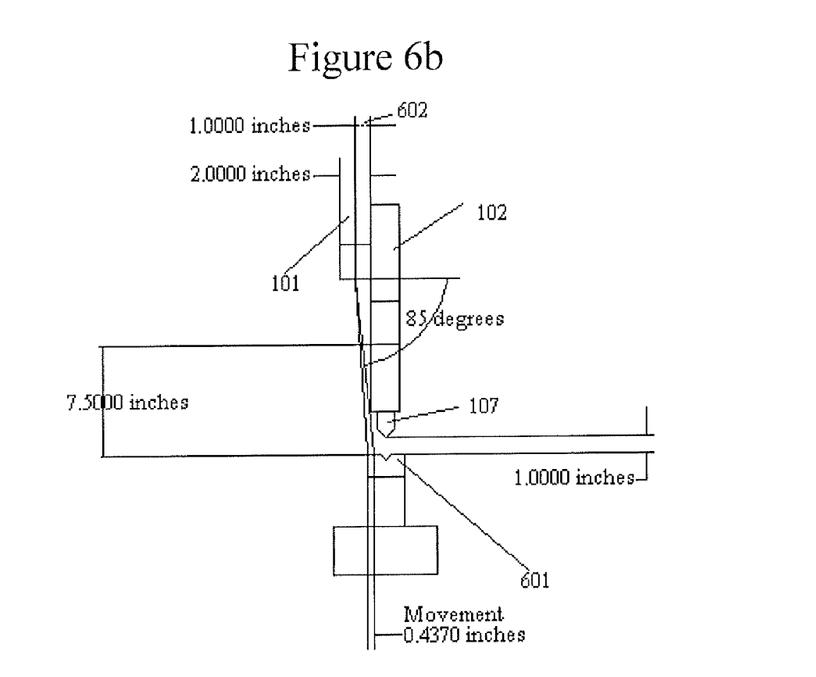

In FIGS. 6a and 6b, there is shown a configuration in which the field of view of a measurement device [101] is targeted on an area adjacent to the surface of the machine [101] which is in contact with the press tool [107] when that press tool [107] is fully descended. In FIG. 6a, the configuration is shown with the press tool [107] in a withdrawn position. FIG. 6b then shows the configuration of 6a with the press tool [107] partially descended, in order to demonstrate the effect of motion on the targeting of the field of view. In order to describe those figures, it is helpful to introduce two terms. First, the term "field of view axis" refers to a line drawn between a measurement device [101] and the center of its field of view. Second, the term "pinchpoint", refers to the surface of the machine [101] which is in contact with the press tool [107] when the press tool [107] is fully descended. In FIG. 6a, a configuration is shown in which the field of view of the measurement device [101] is targeted adjacent to the pinchpoint [601] of the machine [102]. Such specific targeting adjacent to the pinchpoint [601] would be beneficial in situations where an unsafe condition only exists when a portion of an operator's body is between the pinchpoint [601] and the press tool [107], because targeting adjacent to the pinchpoint [601] would minimize the likelihood of an unsafe condition being incorrectly indicated due to a portion of an operator's body approaching, but not entering, the area between the pinchpoint [601] and the press tool [107]. In order to better illustrate the targeting adjacent to the pinchpoint [601], both FIGS. 6a and 6b include lines extending from the measurement device [101] to the edges of the measurement device's field of view.

In FIG. 6a, the measurement device [101] is positioned on a machine [102] in such a manner that there is an offset [602] between the center of the measurement device [101] and the front surface of the machine [102]. Because of that offset to target the field of view adjacent to the pinchpoint [601], the field of view axis must be set at an angle relative to the direction of motion of the press tool [107]. As will be obvious to one of ordinary skill in the art, the setting of the angle of the field of view axis can be accomplished in numerous ways. For example, in some embodiments, the mounting rail [103] (not depicted in FIG. 6a) on which the measurement device [101] is located might be set at an angle. Alternatively, the measurement device [101] itself might include a mirror or a lens which could have the effect of establishing an angle between the field of view axis and the direction of motion of the press tool [107]. An additional factor which should be taken into consideration when setting the angle of the field of view axis is the relationship between the measurement device [101] and the press tool [601]. In some embodiments, such as that depicted in FIGS. 6a and 6b, the measurement device [101] might be positioned so that it moves with the press tool [107]. Alternatively, the measurement device [101] might have a fixed position in space so that it remains stationary while the press tool [107] descends toward the pinchpoint [601].

As shown in FIG. 6b, whether the measurement device [101] moves or remains stationary can have a significant impact on the targeting of the field of view. In FIG. 6b, as the press tool [107] descends, the field of view of the measurement device [101] moves progressively further away from the pinchpoint [602], thereby decreasing the benefits of targeting the pinchpoint [601] described previously. There are a number of ways to avoid that result which might be used in various embodiments. For example, in some embodiments, as the press tool [107] descends, the angle of the field of view axis would change to compensate, ensuring that the field of view remains targeted on the pinchpoint [601]. Such compensation might be a fixed rate of movement, or might be a variable rate of movement, configurable by the user. Another method for compensating for the motion of the measurement device [101] is simply to eliminate that motion by positioning the measurement device [101] such that it remains stationary as the press tool [107] descends. A third method for compensating comprises configuring the width of the field of view of the measurement device [101] such that the pinchpoint [601] is always within the measurement device's field of view. Further, as will be obvious to one of ordinary skill in the art, other methods might be used to target the field of view, and multiple methods might be combined in targeting the field of view, so long as the measurement device [101] is able to collect data which could indicate unsafe conditions throughout the entire stroke of the machine [102].

In some embodiments, the measurement devices [101] might be equipped with a laser or other light source which could be used to aid setting an angle for the field of view axis by illuminating the field of view targeted by a measurement device [101]. While a measurement device [101] is being positioned on a machine [102], the operator of the machine [102] could adjust the angle of the field of view axis for the measurement device [101] until an appropriate field of view is indicated. In that same vein, measurement devices [101] might also be configured to provide some indication of their fields of measurement [104], for example, by shining a light on the field of measurement [104] during the operation of the machine [102]. This indication of the field of measurement [104] might provide a reminder to the machine's [102] operators that they should avoid placing parts of their body where they could potentially be injured by the press tool [107] of the machine [102].

Figure 7:
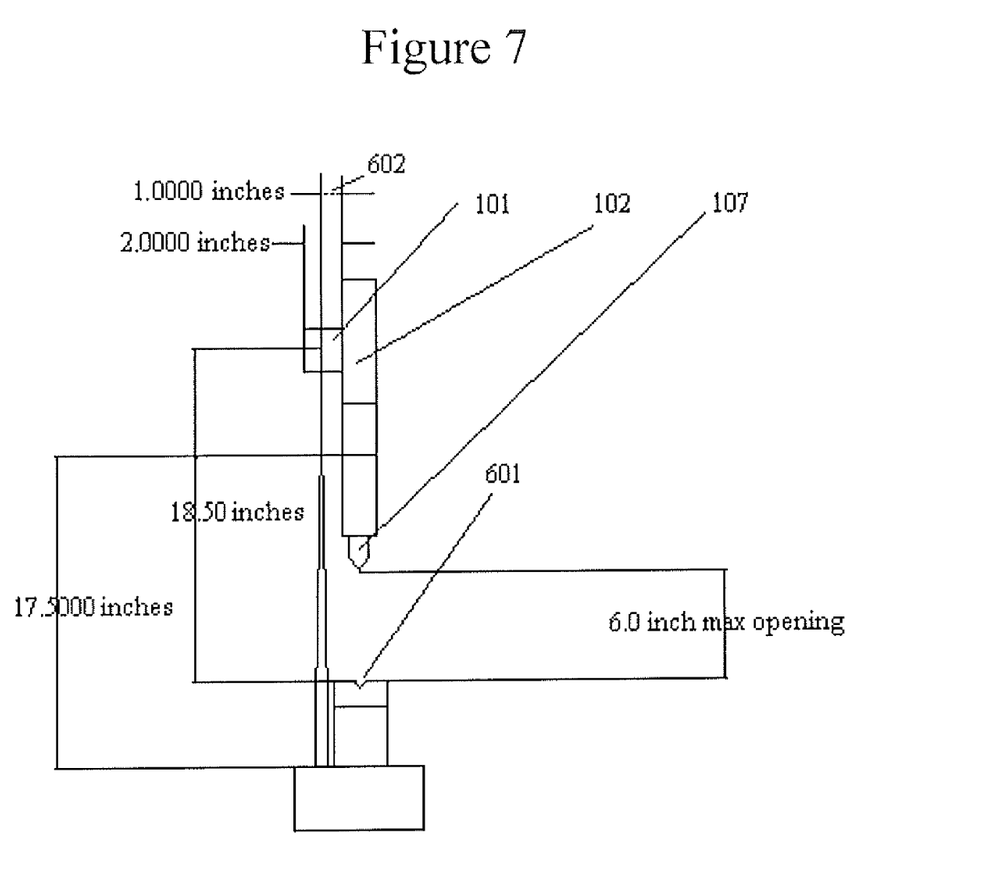
FIG. 7 depicts a configuration in which a field of view axis is parallel relative to the direction of motion of a machine.

While FIGS. 6a and 6b described the operation of embodiments which target the pinchpoint [601] of a machine [102], not all embodiments include such targeting. For example, as shown in FIG. 7, some embodiments might have a measurement device [101] configured with a field of view axis which is set either parallel to, or at only a slight angle to, the direction of motion of the machine [102], and in which the field of view is not targeted adjacent to the pinchpoint [601].

Figure 8A:
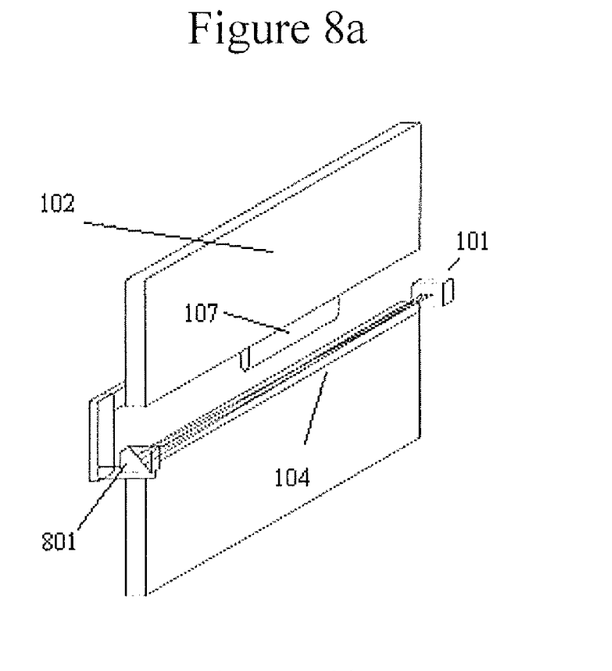
FIGS. 8a-8b depict two alternate methods of positioning measurement devices on a machine.
Figure 8B:
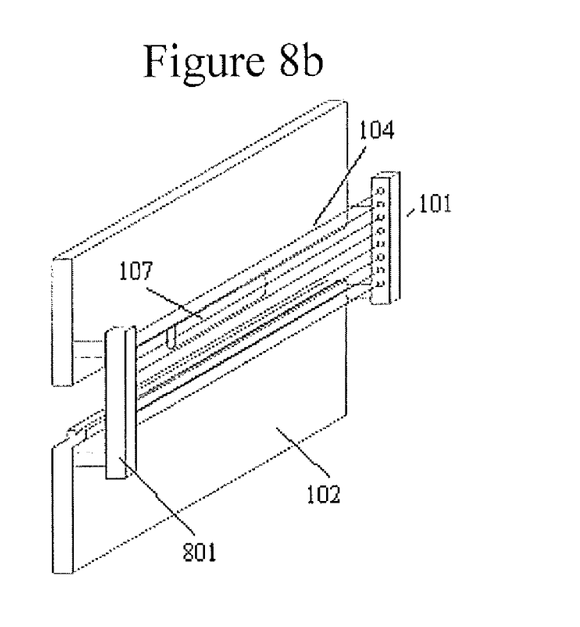

As yet another alternative configuration, consider the embodiments of 8a and 8b. Note that FIGS. 8a and 8b depict lines illustrating the field of view axes in those embodiments. In FIGS. 8a and 8b, the field of view axes of the measurement devices [101] are disposed perpendicular to the direction of motion of the machine [102]. This perpendicular disposition requires that the embodiments of FIGS. 8a and 8b include a backstop [801] on which the fields of view of the measurement devices [101] will terminate if they are not blocked by material being worked by the machine [102], or by a portion of an operator's body. If such a backstop [801] were omitted from an embodiment of the type depicted in FIG. 8a or 8b, the measurement device [101] might inadvertently indicate an unsafe condition by collecting data on a field of view which is located beyond the edge of the machine [102], and therefore irrelevant to the existence of an unsafe condition.

The nature of the configuration which should be used in particular circumstances can be based on the importance of avoiding incorrectly indicating unsafe conditions and the physical environment in which an unsafe condition might arise. In order to discuss the relative merits of different configurations, it is helpful to define the term "danger area" to be the area which must be entered into or passed through in order to create an unsafe condition. For example, in the case of a machine [102] of the type shown in FIG. 1, the danger area includes the area beneath the press tool [107], as well as the area through which material, such as a piece of steel or a portion of a human body, would have to pass in order to enter into the area beneath the press tool [107]. As discussed with regard to FIGS. 6a and 6b, one way to minimize the likelihood of incorrectly indicating an unsafe condition is to monitor only the area beneath the press tool [107]. However, in some circumstances, such limited monitoring might not be practical. In such situations, it might be necessary to monitor a portion of the danger area which is not directly under the press tool [107], as is shown in FIGS. 8a and 8b. Such configurations might indicate an unsafe condition when there was actually no portion of the operator's body under the press tool [107], but might have the countervailing advantages in terms of cost or ease of installation. Thus, what portions of a danger area should be monitored will depend on the specific attributes of the unsafe condition sought to be detected and the environment in which the unsafe condition might arise.

It should be noted that there are numerous variations of potential measurement devices [101] which might be incorporated into an embodiment of the invention. For example, in embodiments where a measurement device [101] measures temperature, there are multiple methods of making that temperature measurement. For instance, temperature might be measured using multiple independent infrared detectors which detect adjacent, yet distinct, bands of infrared light and taking the ratio of the output of those detectors to compensate for potential variations in emissivity between materials. Further, some measurement devices [101] which measure temperature might use a laser to measure the emissivity of the material being monitored, thus obviating the need for measuring multiple infrared bands. Of course, as will be obvious to one of ordinary skill in the art, the use of lasers can be combined with the use of measurements of multiple bands of infrared radiation to measure temperature. Alternatively, the measurement device [101] might use neither multi-spectrum detection nor laser emissivity measurement when determining temperature. Further, as will be apparent to one of ordinary skill in the art, some measurement devices might not measure temperature at all, but might instead collect data related to some other characteristic by which different materials (e.g., steel and fingers) might be distinguished from one another. For example, the measurement device might simply measure the emissivity of a piece of material and, rather than using that measurement in conjunction with a measurement of infrared radiation to obtain temperature data, use that measurement to determine whether the material being measured is of the type which should be deformed by a machine (e.g., polished steel, having an emissivity of 0.07) or is of a type which should not be deformed by a machine (e.g., a human finger, having an emissivity of 0.98).

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in operation which may be resorted to are intended to fall within the scope of the invention.

The invention claimed is:

1. A machine comprising:
  a) a safety device configured to obtain a plurality of measurements, said plurality of measurements comprising a first measurement and a second measurement;
  b) a processor, wherein the processor is configured to perform a set of steps comprising:
    i) determining a differential based at least in part on a set of information comprising said first measurement and said second measurement;
    ii) identifying an unsafe condition based at least in part on said differential; and
    iii) if the unsafe condition is identified, generating a signal indicating that a protection mechanism should be triggered.

2. The machine of claim 1 wherein the plurality of measurements comprise a plurality of temperature measurements.

3. The machine of claim 2 wherein obtaining the plurality of temperature measurements comprises detecting a plurality of wavelengths of infrared radiation.

4. The machine of claim 2 wherein the processor is configured to receive an identification of an acceptable temperature.

5. The machine of claim 1 wherein the differential is a temporal differential.

6. The machine of claim 1 wherein the differential is a spatial differential.

7. The machine of claim 1 wherein obtaining a plurality of measurements comprises obtaining a plurality of emissivity measurements.

8. A safety device configured to perform a set of steps comprising:
  a) comparing an ambient temperature to a predetermined temperature range;
  b) if the ambient temperature is within the predetermined temperature range, triggering a protection mechanism;
  c) obtaining a temperature measurement;
  d) determining a differential between the ambient temperature and the temperature measurement;
  e) if the differential indicates an unsafe condition, triggering the protection mechanism;
  f) designating the temperature measurement as the ambient temperature; and
  g) repeating a plurality of steps (a)-(f) at least one time.

9. The safety device of claim 8 wherein the step of repeating the plurality of steps (a)-(f) at least one time comprises repeating steps (c)-(f) at least one time.

10. The safety device of claim 9, wherein the step of repeating the plurality of steps (a)-(f) at least one time comprises repeating steps (a)-(b) at least one time.

11. The safety device of claim 8 wherein a progression of steps consisting of steps (c), (f), (a) and (b) is performed at least once, and wherein the step of repeating a plurality of steps (a)-(f) at least one time comprises repeating a progression of steps comprising steps (c), (d), (e) and (f) at least one time.

12. The safety device of claim 8 wherein the step of comparing the ambient temperature to the predetermined temperature range comprises comparing the ambient temperature to a temperature range based at least in part on a temperature of a human body.

13. The safety device of claim 8 wherein the step of comparing the ambient temperature to the predetermined temperature range comprises comparing the ambient temperature to a temperature range based at least in part on a characteristic of a safety device.

* * * * *